United States Patent Office 3,560,082
Patented Feb. 2, 1971

3,560,082
OPTICAL INVERTING SYSTEMS
James Morriss Burch and John William Charles Gates, Teddington, England, assignors to National Research Development Corporation, London, England
Continuation of application Ser. No. 622,755, Mar. 13, 1967. This application Nov. 5, 1969, Ser. No. 874,372
Claims priority, application Great Britain, Mar. 16, 1966, 11,615/66
Int. Cl. G02b 5/04
U.S. Cl. 350—286
7 Claims

ABSTRACT OF THE DISCLOSURE

A device for producing from an entering light beam two emerging beams which are mutually inverted with respect to a straight line defined by the device. The entering beam is split at a first semi-reflecting film into two component beams, which are respectively redirected onto opposite faces of a second semi-reflecting film separate from the first by means of two similar and similarly orientated reversing reflectors, for example roof prisms, which are set optically orthogonal to each other and disposed to give equal path lengths for the two component beams between the two films.

---

Figure 1:
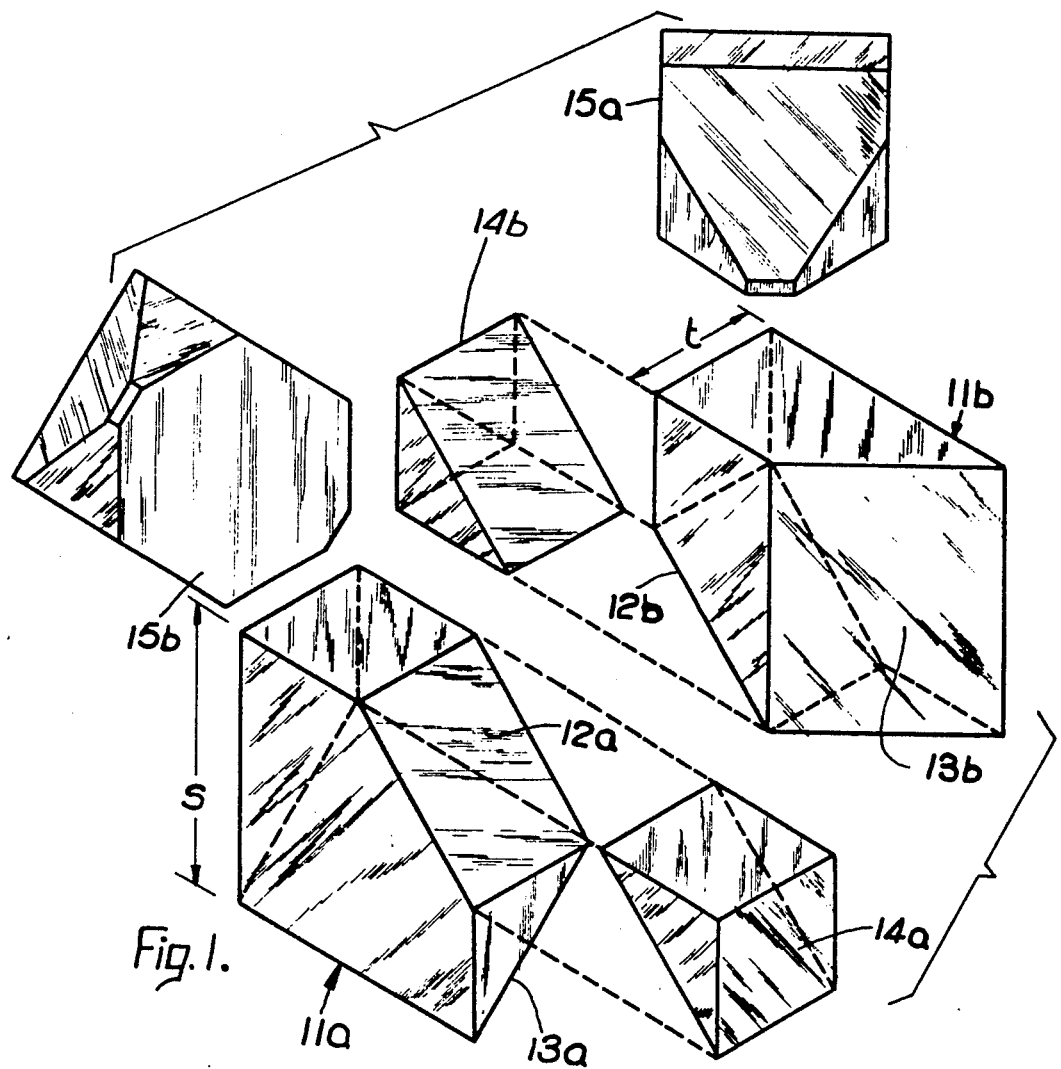

This application is a continuation of Ser. No. 622,755, filed Mar. 13, 1967, now abandoned.

This invention relates to optical systems which divide a light beam into two and invert one-half, i.e. produce from a single entering beam of light two emerging beams which are mutually inverted with respect to a straight line. In systems of this kind the line of symmetry is predetermined by the system and not at all dependent on the illumination, so that such a system can be used to establish a line which is independent of the illumination. For many purposes, however, it is desirable or necessary that the transmission efficiency along the two paths through the system should be substantially equal.

An inverting system of the above character may (as set forth in our application Ser. No. 557,563 filed June 14, 1966 comprise a beam splitter plate (transparent plate carrying a semi-reflecting film) at 45° to a predetermined entry axis along which an entrance beam is intended to be directed, succeeded by two roof prisms set with their ridges perpendicular to one another and one in the beam directly transmitted through the splitter plate with its ridge centrally placed in the beam and the other in the beam first reflected by the plate with its ridge centrally placed in the beam. For the purpose set forth in the application it was pointed out that the prism system should desirably consist of components cemented together.

Such a system if perfectly constructed is symmetrical but each roof edge divides the field down the centre and in practice the spacing of the roof reflectors from the semi-reflector must be controlled to a small fraction of a wave length to optimise the proportion of the light emerging in the required direction.

An optical system according to the present invention comprises an assembly of prismatic units incorporating a planar dividing means disposed for illumination by a beam of light entering the system so as to arrive at the dividing means at least approximately aligned with a first given axis intersecting the dividing means. The dividing means is partially reflecting and partially transmitting to split the entering beam into first and second component beams. A planar recombining means separate from the dividing means, is also provided with the recombining means being partially reflecting and partially transmitting. A first set of planar internally reflecting surfaces is disposed with given angular relationships between the individual surfaces of the set and between these surfaces and said dividing and recombining means. This first set of surfaces is disposed so that all rays of the first component beam will be reflected successively at the surfaces of said first set in the same order to arrive at one face of the recombining means with the relationship between individual rays of the first component beams reversed, as compared with the relationship between the corresponding individual rays of the entering beam, with respect to a first plane containing the first given axis. A second set of planar internally reflecting surfaces is provided equal in number to the surfaces of the first set and disposed with angular relationships between the individual surfaces of the second set and between these surfaces and the dividing and recombining means similar to the given angular relationships between the individual surfaces of the first set and between the individual surfaces of the first set and the dividing and recombining means and dividing said component beams. This second set of surfaces is disposed so that all rays of the second component beam will be reflected successively at the surfaces of said second set in the same order to arrive at the face of the recombining means opposite the one face with the relationship between individual rays of the second component beam reversed, as compared with the relationship between the corresponding individual rays of the entering beam, with respect to a second plane, orthogonal to said first plane, containing said first given axis. The first and second sets of surfaces are also disposed so that, for a ray of light entering the system so as to arrive at the dividing means along the first given axis, the paths of the two corresponding rays respectively reflected and transmitted by the dividing means will intersect each other at a given point of the recombining means and will be of equal lengths between the dividing and recombining means. That part of one component beam which is reflected by the recombining means and that part of the other component beam which is transmitted by said recombining means respectively constitute two emerging beams which leave the recombining means mutually inverted with respect to a second given axis passing through said given point. Each of said first and second sets of surfaces may be constituted by a pair of inclined faces of a roof prism, in which case the requirement for the recombining means to be separate from the dividing means involves the use of larger prisms than in the prior arrangement referred to but they are disposed so that each receives the whole of the relevant component beam on one inclined face and returns it wholly from the other inclined face so that the ridge does not intersect the field and cause obstruction and the ridge portion of the prisms can be omitted. Another valuable advantage is that this enables the tolerance on prism angles to be greatly relaxed.

The beam may enter (suitably normally or approximately normally to the entry surface) a unit of transparent material hereinafter referred to as glass which includes a first semi-reflecting film set at 45° to the axis of the beam. The part of the beam which continues through the film enters a first 90° double reflecting roof-type prism without a substantial portion of its ridge but with a sufficient area of one reflecting surface to intercept the beam, while the part of the beam which is reflected by the film enters a second 90° double reflecting roof-type prism similar to the first but set with its (imaginary) ridge line optically perpendicular to that of the first. These two double reflecting prisms are of such size and so set that each returns the beam entering it clear of the path of the entering beam, but with their axes in the same plane (for a correctly aligned entering beam) the two returned beams being at right angles to one another and falling on to opposite sides of a second semi-reflecting film set at 45° to the axes of the two returned beams. This second semi-reflecting film is positioned to ensure equal path lengths for the respective beams. The part of the beam returned by the first roof-type prism which is reflected at this second semi-reflecting film, and the part of the beam returned by the second roof-type prism which passes through the second semi-reflecting flm, constitute the two emergent beams of the system, which suitably emerge through an exit surface normal to the axes of symmetry of these two beams. It will be understood that the light could pass partly through air and partly through glass but preferably is through glass in the whole of its path through the unit, but the unit can then (and indeed must) be built-up from components cemented together.

As above described the predetermined entry axis along which the beam must enter if the emerging beams are to be exactly superposed, and the axis of symmetry of the emerging beams do not intersect and they are at right angles to one another. They can be made to intersect while remaining at right angles, by introducing a 45° surface at which internal reflection occurs either between the entering surface and the first semi-reflecting film, or between the second semi-reflecting film and the exit surface. By providing a first reflecting surface at the first mentioned position, and a second at the second mentioned position, the entry axis and the axis of symmetry of the emerging beams can be made collinear.

By way of example of the tolerances which can be allowed in the angles, a unit on the lines above described was made up from stock right-angle prisms and tested in an alignment apparatus on the lines disclosed in application Ser. No. 557,563, filed June 14, 1966. The accuracy of the right angle of these component prisms was of the order of a few minutes of arc only. An Elliot gas laser HNL8 was used and was run in a uniphase output mode at a power of about 200 $\mu$w. An optical system consisting of two spectacle lenses, one of $+4$D power and one of $-20$D power, was used to expand the cross section of the beam from the laser to a diameter of about 6 or 7 mm. This expanded beam was incident on the alignment prism unit. The unit was set up in a room with a maximum available throw of 14 m. The receiving unit was a 4 quadrant silicon photocell and operated in conjunction with a Cambridge spot galvanometer. The photocell unit was mounted on a cross slide with a measuring micrometer and measurements of the power in the light beam transmitted by the alignment prism unit showed that about one third of the output from the laser was transmitted through the prism unit. Typical results indicated that a deflection of the photocell of the order of 10 microns could reliably be detected at 14 m. from the alignment unit. This distance corresponds to an angular change of less than $10^{-6}$ radian, (about ⅕ second of arc).

The accompanying drawings illustrate an example of a cemented unit acting as above described and including reflecting surfaces to render the entering and emerging beams collinear.

Figure 2:
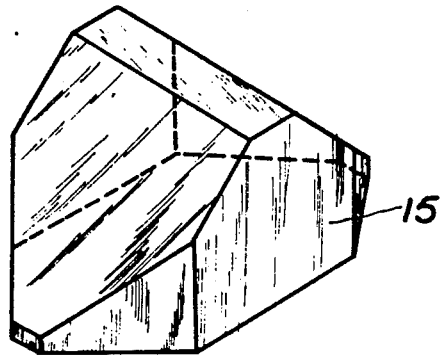
Figure 5:
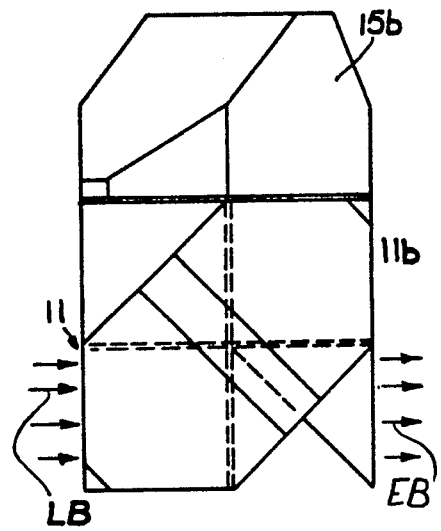
Figure 4:
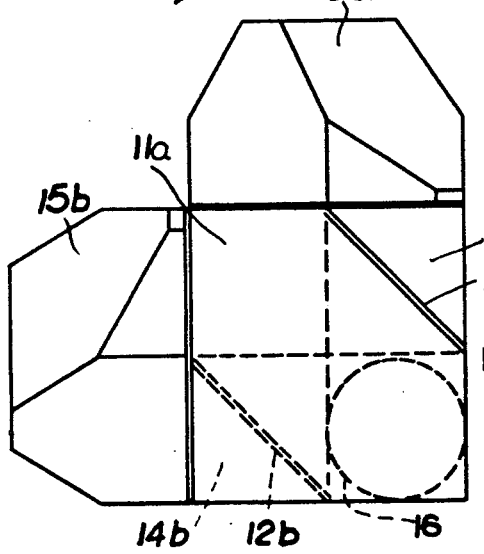
Figure 3:
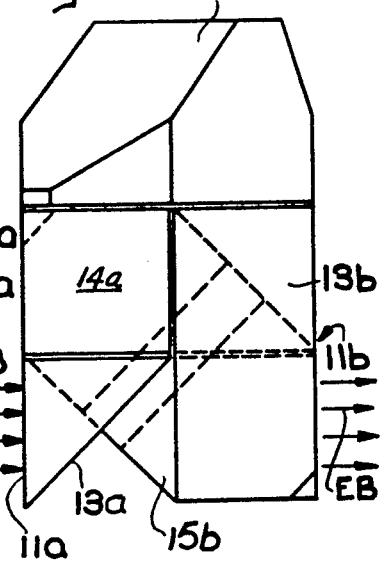

FIG. 1 is an isometric exploded perspective view showing the various components separated, FIG. 2 is an isometric perspective view of one of the roof prisms, taken in a different direction from FIG. 1, FIG. 3 is an elevation of the unit, FIG. 4 is an elevation taken at right angles to FIG. 3 and FIG. 5 is a plan view of FIG. 3.

The main components 11a and 11b shown in FIG. 1 are each derived from a rectangular block of glass having two opposite square faces, the thickness $t$ of the block being half the side $s$ of the square. One top corner of the square block for component 11a and one bottom corner of the square block for component 11b (as seen in the figure) is cut off from the mid line of one narrow face normal to the square faces to the mid line of an adjacent narrow face normal to the square faces to form a plane surface 12a, 12b respectively at 45° to the two sides it intersects. The lower part of the block for component 11a and the side part of the block for the component 11b (as seen in the figure) has its thickness bevelled or cut away at 45° right across, to form planes 13a, 13b respectively, extending from a mid line of one square face intersecting the end of one of the mid lines of the narrow face from which the surface 12a or 12b extends, to the boundary line parallel thereto of the other square face remote from the sides of the square face from the aforesaid mid lines of the narrow faces. From the point of view of function, the surface 13a or 13b need not extend right across but this is easiest to produce. It will be understood that all the transmitting and reflecting surfaces must be optically worked.

The two components 11a, 11b are identical in form and size, but they are cemented together with one reversed and turned through 90° relative to the other, in other words they are cemented together at the incomplete square faces with the said mid lines of the square faces at right angles to one another and crossing at their mid points, with the plane surfaces 12a, 12b spaced apart. As a result of the mutual positioning of the components, faces 12a, 12b are parallel with one another while the faces 13a, 13b are bevelled to a 45° dihedral angle which lies in the vertical plane in the case of the face 13a and in the horizontal plane in the case of the face 13b. The faces 12a, 12b are coated with semi-reflecting films and on these are cemented subsidiary components in the form of right angle prisms 14a, 14b respectively, thus completing a cubic piece apart from the spaces due to the bevelled faces 13a, 13b. On the upper face of the cube and on one side face are cemented respective ridgeless double reflecting prisms 15a, 15b. As will be seen from FIGS. 3 and 5 these are set with the imaginary ridge lines diagonally over respective faces of the cube and they are of such size that one inclined face adequately covers one-quarter of a side surface of the cube.

For a beam LB entering as indicated in FIGS. 3 and 5 and applying the previous description the surface 13a is the first reflecting surface, the surface 12a carries the first semi-reflecting surface, constituting the dividing surface, the surface 12b carries the second semi-reflecting surface, constituting the recombining surface, the prism 15a is the first double-reflecting roof-type prism, the prism 15b is the second double-reflecting roof-type prism, the surface 13b is the second reflecting surface, while prisms 14a, 14b provide the glass for the passage of the light between the double reflecting prisms and the semi-reflecting surfaces. The two mutually inverted light beams emerge at EB and the maximum aperture of the system is indicated by the dotted circle 16 in FIG. 4.

It will be seen that the structure shown in the drawings has been reduced to a small bulk for the required light paths. Also that it is made of a small number of components. The components 11a, 11b are not of a standard form but are not particularly difficult to make in comparison with those which are. The prisms 14a and 14b are first cemented respectively to the components 11a and 11b and the sub-assemblies so formed are cemented together. The faces on which the roof prisms 15a, 15b are to be cemented can be finished so far as necessary to bring the part surfaces formed by the different components into a plane.

As applied to the apparatus disclosed in application Ser. No. 557,563, filed June 14, 1966, if the unit makes the entry axis collinear with the axis of symmetry of the emerging beams sufficiently accurately, it becomes possible to insert the unit into a laser beam, after initial rough lining-up with the beam alone. Further, rotation of the unit will then check the symmetry of its mounting. Such a unit could be used in both directions, possibly simultaneously, so that a laser beam can be projected in opposite directions from that unit which is defining the line. In the preliminary setting up operation it has been found convenient to make the initial adjustment of the use of the laser by sighting at the distant target through the unit which acts as a double image unit. Two images of the target are seen which can be made to approach each other and coincide by adjustment of the alignment device or by the adjustment of the target. The resulting configuration is found to lie within very close limits of the ultimate alignment which is given by the use of the laser.

Where the unit above described, the entering and emerging beams of which are collinear, is used in both directions, the two directions are at 180° to one another. By using an additional prisms for example, or by setting one or both of the surfaces 13a and 13b at an angle other than 45°, the angle between the two directions can be made different from 180°, and indeed anything greater than 90°; the latter angle can be achieved with only one of the surfaces 13a, 13b as above explained. Also the same inverting action can be obtained using angles other than 45° and 90° in the unit, but these angles are most convenient for practical production. It is also possible to make the unit of fewer components by appropriate choice of the angles and shape of the components, but production is then generally more difficult.

In some cases it may be advantageous to coat external surfaces of the unit, particularly those of the roof prisms, with thin films, for example to control the polarization of light passing through the unit.

Although the optical system according to the invention has been described in relation to the alignment apparatus of application Ser. No. 557,563, filed June 14, 1966 this is not its only field of use. Thus for example, the system can be used in the testing of optical systems or components such as lenses, the angular adjustment of reflecting surfaces, or generally in the type of interferometer system known as a common path interferometer in which for example the emerging beam is reflecting back along its original path and thus transverse the unit twice in sequence. In the latter application in particular, the above mentioned film coatings to control polarization are of advantage.

We claim:

1. An optical system comprising
   means for dividing an entering beam into two beams and directing the two beams along different paths,
   respective reflecting means in the paths of the two beams which redirect the beams along intersecting return paths which clear said dividing means and are of equal length at the region of intersection,
   each of said reflecting means acting in one plane to return the beam parallel to but displaced from its path to the reflecting means and in a plane orthogonal thereto in a path such that the angle of reflection is equal to the angle of incidence,
   said two reflecting means being set orthogonally with respect to one another,
   means separate from said dividing means located at the region of intersection of the returned beams for recombining the two beams and so redirecting at least one of them that the axes of the two beams are disposed symmetrically in relation to a predetermined direction, and
   two additional reflecting surfaces one set in the path of the entering beam before it reaches the dividing means and the other set in the path of the two beams after they emerge from the recombing means,
   said additional reflecting surfaces being so set in relation to one another and the beams as to cause a predetermined entry axis of the system and the axis of symmetry of the emerging beams to lie in a common plane, the angle between them being susstantially greater than 90°.

2. An optical system comprising an assembly of prismatic units incorporating:
   a planar dividing means disposed for illumination by a beam of light entering the system so as to arrive at the dividing means at least approximately aligned with a first given axis intersecting the dividing means, the dividing means being partially reflecting and partially transmitting to split the entering beam into first and second component beams;
   a planar recombing means separate from said dividing means, the recombing means being partially reflecting and partially transmitting;
   a first set of planar internally reflecting surfaces disposed with given angular relationships between the individual surfaces of the set and between these surfaces and said dividing and recombining means, said first set of surfaces being disposed so that all rays of the first component beam will be reflected successively at the surfaces of said first set in the same order to arrive at one face of said recombining means with the relationship between individual rays of the first component beam reversed, as compared with the relationship between the corresponding individual rays of the entering beam, with respect to a first plane containing said first given axis; and
   a second set of planar internally reflecting surfaces equal in number to the surfaces of said first set and disposed with angular relationships between the individual surfaces of the second set and between these surfaces and said dividing and recombining means similar to said given angular relationships between the individual surfaces of said first set and between the individual surfaces of said first set and said dividing and recombining means, said second set of surfaces being disposed so that all rays of the second component beam will be reflected successively at the surfaces of said second set in the same order to arrive at the face of said recombining means opposite said one face with the relationship between individual rays of the second component beam reversed, as compared with the relationship between the corresponding individual rays of the entering beam, with respect to a second plane, orthogonal to said first plane, containing said first given axis,
   said first and second sets of surfaces further being disposed so that for a ray of light entering the system so as to arrive at said dividing means along said first given axis the paths of the two corresponding rays respectively reflected and transmitted by said dividing means will intersect each other at a given point of said recombining means and will be of equal lengths between said dividing and recombining means, that part of one of said component beams which is reflected by said recombining means and that part of the other of said component beams which is transmitted by said recombining means respectively constituting two emerging beams which leave said recombining means mutually inverted with respect to a second given axis passing through said given point and dividing said component beams.

3. An optical system according to claim 2 further incorporating an additional planar internally reflecting surface disposed in the path of the entering beam so that a ray of light entering the system along a predetermined entry axis which intersects said second given axis will be reflected to travel along said first given axis to said dividing means.

4. An optical system according to claim 2, further incorporating an additional planar internally reflecting surface disposed in the path of the two emerging beams so that a ray of light leaving said recombining means along said second given axis will be reflected to leave the system along a predetermined exit axis which intersects said first given axis.

5. An optical system according to claim 2, further comprising:

a first additional planar internally reflecting surface disposed in the path of the entering beam so that a ray of light entering the system along a predetermined entry axis will be reflected to travel along said first given axis to said dividing means; and a second additional planar internally reflecting surface disposed in the path of the two emerging beams so that a ray of light leaving said recombining means along said second given axis will be reflected to leave the system along a predetermined exit axis coplanar with, and making an angle of substantially greater than 90° with, said predetermined entry axis.

6. An optical system as set forth in claim 7 embodied in a unit made up of transparent components cemented together with optical cement, said dividing means consisting of a first semi-reflecting film located between a first main component and a first subsidiary component, each of said first and second sets of surfaces being constituted by a pair of inclined faces of a roof prism disposed to receive the whole of the relevant component beam on one inclined face and return it wholly from the other inclined face, and said recombining means consisting of a second semi-reflecting film set parallel to and spaced from said first film and located between a second main component and a second subsidiary component, said main components being cemented together.

7. An optical system as set forth in claim 6 in which the first main component includes a first additional surface at which the entering beam is reflected by internal reflection and thus redirected towards said first semi-reflecting film and said second main component includes a second additional surface at which the beams emerging from said second semi-reflecting film are reflected with their axis of symmetry collinear with an entry axis predetermined by the disposition of said first additional surface.

References Cited

UNITED STATES PATENTS 3,389,632   6/1968   Plummer _____ 88—14(A)

DAVID SCHONBERG, Primary Examiner

R. L. SHERMAN, Assistant Examiner